(12) United States Patent
Shao et al.

(10) Patent No.: US 11,842,549 B2
(45) Date of Patent: Dec. 12, 2023

(54) METHOD AND SYSTEM FOR MUCK TRUCK MANAGEMENT IN SMART CITY BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Lei Zhang, Chengdu (CN); Yong Li, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/047,269

(22) Filed: Oct. 17, 2022

(65) Prior Publication Data

US 2023/0061710 A1 Mar. 2, 2023

(30) Foreign Application Priority Data

Sep. 26, 2022 (CN) .......................... 202211169337.6

(51) Int. Cl.
*G06V 20/56* (2022.01)
*B65F 3/02* (2006.01)

(52) U.S. Cl.
CPC .............. *G06V 20/588* (2022.01); *B65F 3/02* (2013.01); *B65F 2003/0263* (2013.01)

(58) Field of Classification Search
None
See application file for complete search history.

(56) References Cited

U.S. PATENT DOCUMENTS

| 11,488,467 | B1 * | 11/2022 | Nguyen | ............. | G08B 21/0476 |
| 2003/0213702 | A1 * | 11/2003 | Mann | .................. | C02F 1/46109 205/742 |

(Continued)

FOREIGN PATENT DOCUMENTS

| CN | 102411767 A | 4/2012 |
| CN | 102830672 A | 12/2012 |

(Continued)

OTHER PUBLICATIONS

M. Prasanth, P. Srinivasan and M. Pendyala, "Automated waste clearance: Street-wise cleanliness!," 2013 International Conference on Human Computer Interactions (ICHCI), Chennai, India, 2013, pp. 1-5, doi: 10.1109/ICHCI-IEEE.2013.6887798. (Year: 2013).*

(Continued)

*Primary Examiner* — Santiago Garcia
(74) *Attorney, Agent, or Firm* — METIS IP LLC

(57) ABSTRACT

The disclosure provides a method and a system for muck truck management in a smart city based on Internet of Things. The method is performed by a management platform, including: obtaining construction site information, determining a target monitoring device of a target site based on the construction site information, obtaining muck truck monitoring data of the target site through the target monitoring device, and performing muck processing information analysis based on the muck truck monitoring data to generate muck truck management information.

4 Claims, 5 Drawing Sheets

(56) References Cited

U.S. PATENT DOCUMENTS

| | | | |
|---|---|---|---|
| 2014/0107953 A1* | 4/2014 | Mueller | G01N 35/0099 702/54 |
| 2016/0363935 A1* | 12/2016 | Shuster | G08G 1/0141 |
| 2018/0165822 A1* | 6/2018 | Uliyar | G06T 7/62 |
| 2019/0084899 A1* | 3/2019 | Loyola Irribarra | B01D 29/50 |
| 2021/0024068 A1* | 1/2021 | Lacaze | B60W 60/0025 |
| 2021/0056492 A1* | 2/2021 | Zass | G06V 20/52 |
| 2021/0295472 A1* | 9/2021 | Du | G06V 20/54 |
| 2022/0204259 A1* | 6/2022 | Moore | B65F 5/00 |
| 2022/0250589 A1* | 8/2022 | Schmalenberg | B60Q 3/80 |
| 2022/0410894 A1* | 12/2022 | Foster | B60W 40/10 |
| 2023/0166632 A1* | 6/2023 | Braunstein | B60L 58/13 320/109 |

FOREIGN PATENT DOCUMENTS

| | | |
|---|---|---|
| CN | 104240156 A | 12/2014 |
| CN | 204331401 U | 5/2015 |
| CN | 104732370 A | 6/2015 |
| CN | 206920895 U | 1/2018 |
| CN | 207096762 U | 3/2018 |
| CN | 111310329 A | 6/2020 |
| CN | 112507834 A | 3/2021 |
| CN | 113610008 A | 11/2021 |
| CN | 113611123 A | 11/2021 |
| CN | 114613141 A | 6/2022 |
| CN | 114926776 A | 8/2022 |

OTHER PUBLICATIONS

Learning-Based System for Debris Detection in Autonomous Cleaning Devices An IP.com Prior Art Database Technical Disclosure Authors et. al.: Disclosed Anonymously IP.com No. IPCOM000268327D IP.com IP.com Electronic Publication Date: Jan. 24, 2022 (Year: 2022).*

First Office Action in Chinese Application No. 202211169337.6 dated Nov. 23, 2022, 18 pages.

The Second Office Action in Chinese Application No. 202211169337.6 dated Dec. 20, 2022, 18 pages.

The Third Office Action in Chinese Application No. 202211169337.6 dated Feb. 4, 2023, 8 pages.

Notification to Grant Patent Right in Chinese Application No. 202211169337.6 dated Mar. 9, 2023, 8 pages.

* cited by examiner

METHOD AND SYSTEM FOR MUCK TRUCK MANAGEMENT IN SMART CITY BASED ON INTERNET OF THINGS

CROSS-REFERENCE TO RELATED DISCLOSURES

This application claims priority to Chinese Patent Application No. 202211169337.6, filed on Sep. 26, 2022, the entire contents of which are incorporated herein by reference.

TECHNICAL FIELD

The disclosure relates to the field of the Internet of Things and cloud platforms, particularly to methods and systems for muck truck management in a smart city based on Internet of Things.

BACKGROUND

With the improvement of urban infrastructure construction and the continuous expansion of urban scale, construction garbage brought about by urban development has also increased. The construction garbage is mainly transported to landfills and other places through muck trucks. Due to the large amount of transportation and the distance of transportation, if the muck trucks are not cleaned thoroughly or the garbage is spilled during transportation, or the drivers of the muck trucks perform illegal dumping, it may have a great impact on the urban public health and urban air quality, and may even cause great traffic hazards.

Therefore, it is desirable to provide a method and a system for muck truck management in a smart city based on Internet of Things so as to reduce the impact of muck truck transportation on urban sanitation, air quality, and traffic safety.

SUMMARY

One or more embodiments of the disclosure provide a method for muck truck management in a smart city based on Internet of Things. The method is implemented based on a system for muck truck management in a smart city. The method is implemented by a management platform, including: obtaining construction site information; determining a target monitoring device of a target site based on the construction site information; obtaining muck truck monitoring data of the target site through the target monitoring device; and generating muck truck management information by performing muck processing information analysis based on the muck truck monitoring data.

One or more embodiments of disclosure provide a system for muck truck management in a smart city based on the Internet of Things. The system includes a management platform configured to: obtain construction site information; determine a target monitoring device of a target site based on the construction site information; obtain muck truck monitoring data of the target site through the target monitoring device; and generate muck truck management information by performing muck processing information analysis based on the muck truck monitoring data.

One or more embodiments of the disclosure provide a non-transitory computer readable storage medium, the storage medium storing computer instructions. When the computer medium reads the computer instructions in the storage medium, the computer executes the aforementioned method.

BRIEF DESCRIPTION OF THE DRAWINGS

The disclosure will be further illustrated in exemplary embodiments which will be described in detail by means of accompanying drawings. These embodiments are not restrictive, in which the same number indicates the same structure, wherein.

DETAILED DESCRIPTION

Figure 1:
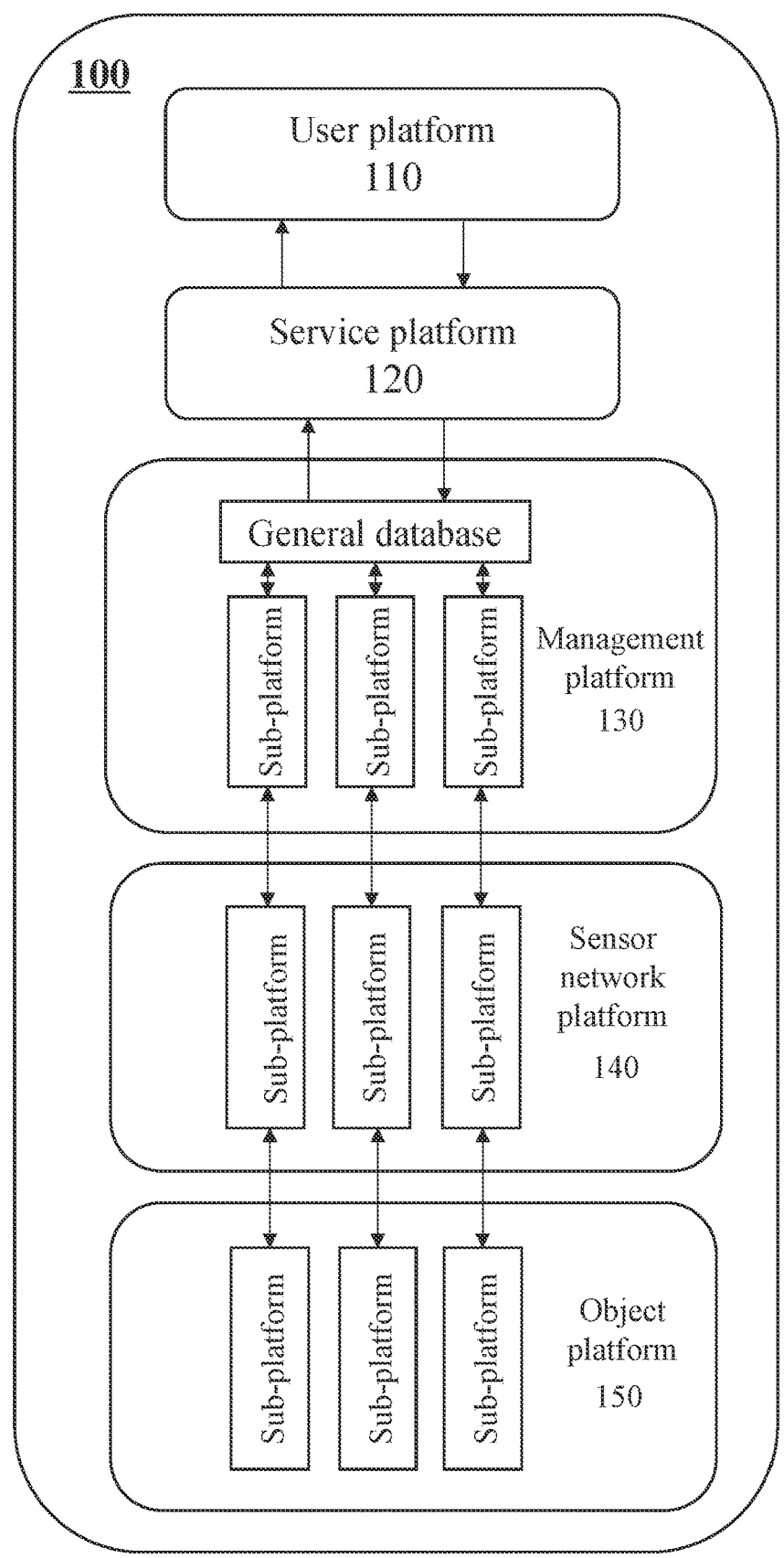
FIG. 1 is a schematic diagram of a platform structure of the system for muck truck management in the smart city according to some embodiments of this disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

It will be understood that the terms "system," "device," "unit," and/or "module" used herein are one method to distinguish different components, elements, parts, sections, or assemblies of different levels. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is the schematic diagram of the platform structure of the system for muck truck management in the smart city according to some embodiments of this disclosure. As shown in FIG. 1, the system for muck truck management in the smart city includes a user platform 110, a service platform 120, a management platform 130, a sensor network platform 140 and an object platform 150.

The user platform 110 may be a platform led by users, and includes platforms for obtaining the needs of the users and feeding information back to the users. In some embodiments, the user platform 110 may be used to send a muck truck management information query instruction to the service platform 120, and receive muck truck management information and feed the muck truck management information back to the user. For example, the user platform 110 may obtain user's input instructions through terminal equipment (e.g., smart equipment such as mobile phones, computers), and query the muck truck management information. As another example, the user platform 110 may feed back the muck truck management information to the user. For more contents about the muck truck management information, please see FIG. 2 and detailed descriptions thereof.

The service platform 120 may be a platform providing input and output services for users. In some embodiments, the service platform may be configured as a first server.

The service platform 120 may be used to manage the interaction of information and/or data between the management platform 130 and the user platform 110. In some embodiments, the service platform 120 may be used to receive the muck truck management information query instruction sent by the user platform 110, send the muck truck management information query instruction to the user platform 110 after storage processing, and obtain the muck truck management information from the management platform 130 and then send the muck truck management information to the user platform 110 after storage processing.

The management platform 130 may refer to an Internet of Things platform that plans and coordinates connection and collaboration between various functional platforms and provides perception management and control management. In some embodiments, the management platform 130 may be configured as a second server.

The management platform 130 may be used for information and/or data processing. In some embodiments, the management platform 130 may be used to respond to the user's query request, process muck truck monitoring data, and determine the muck truck management information.

The management platform 130 may also be used to perform information and/or data interaction with the service platform 120. In some embodiments, the management platform 130 may be used to receive the muck truck management information query instruction sent by the service platform 120, or send the muck truck management information to the service platform 120.

In some embodiments, the management platform 130 is provided with a general database (or "general management platform database") and a plurality of management sub-platforms. A plurality of management sub-platforms store and process data of different types or different receiving objects sent by a lower-level platform respectively. The management platform general database summarizes the data of a plurality of management sub-platforms and stores and transmits to an upper-level platform. In some embodiments, the management sub-platforms may be divided according to urban areas.

The management sub-platforms correspond to the sensor network sub-platforms in a one-to-one manner. In some embodiments, the management sub-platforms obtain the muck truck monitoring data from the corresponding sensor network sub-platforms. Each management sub-platform processes and then stores the obtained muck truck monitoring data, and uploads the processed data to the general management platform database. The general management platform database summarizes the data processed by each management sub-platform and then transmits to the service platform 120. At this time, the data uploaded to the service platform is the muck truck management information of the entire city. For more contents about the muck truck monitoring data and the muck truck management information, please see FIG. 2 and related descriptions thereof.

In some embodiments, the first server and the second server may use a single server or a server cluster.

The sensor network platform 140 may refer to a platform for unified management of sensing communication. In some embodiments, the sensor network platform 140 may be configured as a communication network and a gateway. The sensor network platform 140 may use a plurality of groups of gateway servers, or a plurality of groups of smart routers.

The sensor network platform 140 may include a plurality of sensor network sub-platforms, and the sensor network sub-platforms correspond to the management sub-platforms in a one-to-one manner. In some embodiments, the management sub-platforms store and process different types of muck truck monitoring data sent by the sensor network sub-platforms.

The sensor network sub-platforms and object sub-platforms also in one-to-one correspondence and may be used for information and/or data interaction between the management sub-platforms and the object sub-platforms. In some embodiments, the sensor network sub-platforms are used to receive the muck truck monitoring data obtained by the target monitoring device in the object sub-platforms, and send the muck truck monitoring data to the corresponding management sub-platforms. For more contents of the target monitoring device, please see FIG. 2 and related descriptions thereof.

In some embodiments, the sensor network sub-platforms may be used to receive the muck truck monitoring data sent by the object sub-platforms, and send instructions for obtaining the muck truck monitoring data to the object sub-platforms.

In some embodiments, the sensor network sub-platforms are used to receive the instructions for obtaining the muck truck monitoring data sent by the management sub-platforms, and send the muck truck monitoring data obtained by the sensor network sub-platforms to the corresponding management sub-platforms.

The object platform 150 may refer to a functional platform for monitoring. In some embodiments, the object platform 150 may be configured as various monitoring equipment, such as electronic eyes and cameras.

The object platform 150 may be divided into a plurality of object sub-platforms according to different urban areas, and a plurality of object sub-platforms correspond to the sensor network sub-platforms in a one-to-one manner.

The object sub-platforms may perform information and/or data interaction with the sensor network sub-platforms. In some embodiments, the object sub-platforms are used to receive the instructions for obtaining the muck truck monitoring data sent by the sensor network sub-platforms and send the muck truck monitoring data to the corresponding sensor network sub-platforms.

Some embodiments of this disclosure build the system for muck truck management in a smart city through the functional Internet of Things system structure of five platforms. According to the method, the management platform adopts the combined layout of the general database and the sub-platforms, and the sensor network platform and the object platform adopt the layout of a plurality of sub-platforms to ensure the independence of each data, ensure classified data transmission and traceability and classified instruction issuing and processing, making the IoT structure and data processing clear and controllable, and facilitating IoT control and data processing.

It should be noted that the above description of the system for muck truck management in the smart city does not restrict this disclosure within the scope of the embodiments. It is understandable that for the technical personnel skilled in the art, after understanding the principle of the system, it is possible to make any combination of individual modules or to form a subsystem to connect with other modules without departing from this principle.

Figure 2:
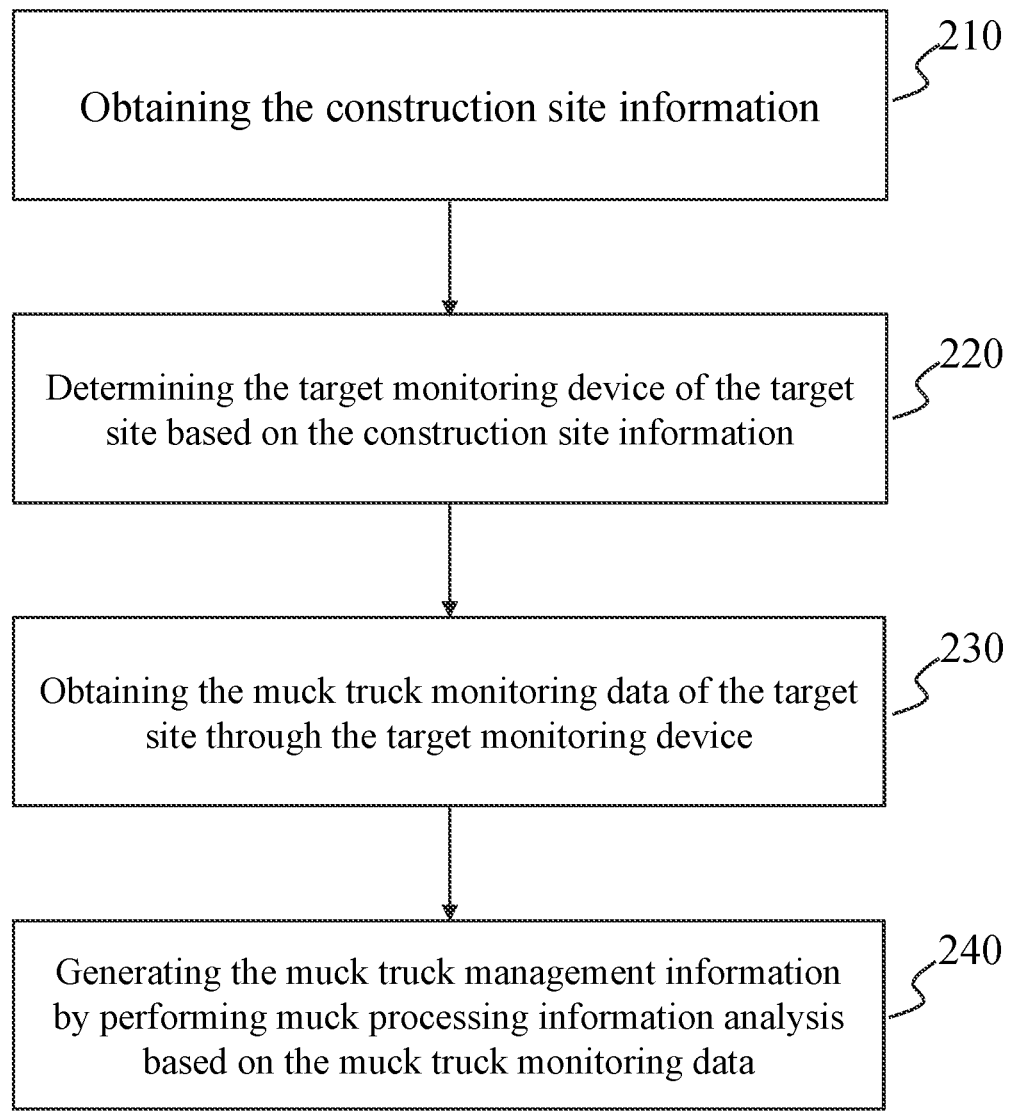
FIG. 2 is an exemplary flowchart of the method for muck truck management in the smart city according to some embodiments of this disclosure.

FIG. 2 is the exemplary flowchart of the method for muck truck management in the smart city according to some embodiments of this disclosure. As shown in FIG. 2, the process 200 is performed by the management platform and includes the following steps.

Step 210, obtaining the construction site information.

The construction site information may be relevant information about a site under construction in the city. The construction site information may include the construction type, whether the muck is transported, transportation road data related to the construction site, etc.

The construction site information may be obtained in various ways. For example, the construction site information may be uploaded by taking phones with drones, by using the monitoring device, or obtained based on a third-party platform. The third-party platform may include a housing and urban construction bureau platform, an environmental protection bureau platform, a security supervision station platform, etc.

Step 220, determining the target monitoring device of the target site based on the construction site information.

The target site may be a surrounding road where the muck truck passes by from the construction site to perform muck transportation.

The target monitoring device may be a device for monitoring the target site, such as the camera around the target site, the electronic eyes on the road around the target site, etc.

In some embodiments, the monitoring device configured at the target site may be directly determined as the target monitoring device, such as the monitoring device around the construction site, the monitoring device on the surrounding road where the muck truck transports the muck, etc. In some embodiments, the target monitoring device may be determined through the third-party platform (e.g., a traffic management platform, etc.).

Step 230, obtaining the muck truck monitoring data of the target site through the target monitoring device.

The muck truck monitoring data may be the relevant information of the muck truck obtained by the target monitoring device, for example, whether the wheels of the muck truck have mud stains, whether the muck in the muck truck is dropped, road condition data, etc.

In some embodiments, the muck truck monitoring data may include the monitoring data of continuous records before and after the muck truck passes the target site obtained by the target monitoring device. In addition to the relevant data of the muck truck itself (e.g., whether the wheels of the muck truck have mud stains, whether the muck in the muck truck is dropped, etc.), the monitoring data may also include the time when the muck truck passes the target site and the relevant data of the target site, such as the dropped muck data and dust data on the road, environmental data, etc. The environmental data may include data such as light intensity, wind direction and wind speed, and may be collected by a sensor configured at the target monitoring device.

Step 240, generating the muck truck management information by performing muck processing information analysis based on the muck truck monitoring data.

Muck information processing analysis may be used to process and analyze the muck-related information. For example, the dropped muck situation and the dust situation on the road may be obtained based on the analysis of the muck truck monitoring data, etc.

Muck information processing analysis may be implemented in various ways. For example, analysis may be carried out by artificially comparing the monitoring images before and after the muck truck passes the target site, or by using an image recognition model. For more contents about the muck processing information analysis, please see FIG. 3, FIG. 4 and related descriptions thereof.

The muck truck management information may be the relevant information used to manage and operate the muck truck. For example, when the result determined by the muck processing information analysis is that the carriage has gaps, large vibrations, etc., the generated muck truck management information indicates the problem of the muck truck itself, and the muck truck needs to be repaired accordingly. As another example, when the result determined by the muck processing information analysis is that the wheels of the muck truck have mud stains, the generated muck truck management information indicates that the construction unit does not rinse the muck truck thoroughly and shall increase rinsing effort later.

In some embodiments, after generating the muck truck management information, the management platform may send the muck truck management information to the user platform through the service platform. Users with demands may learn about the management situation of muck truck through the user platform. The management platform may also send a management instruction to the corresponding responsible unit through the sensor network platform, and the responsible unit may perform relevant measures according to the muck truck management information.

In some embodiments of this disclosure, the scope of monitoring is reduced by means of determining the target monitoring device, which is conducive to reducing the computing amount of the system; the management platform performs muck processing information analysis based on the muck truck monitoring data, and generates the muck truck management information so that the muck truck pollution reason may be quickly determined, and the responsible party is clarified to better implement the management of the muck truck.

Figure 3:
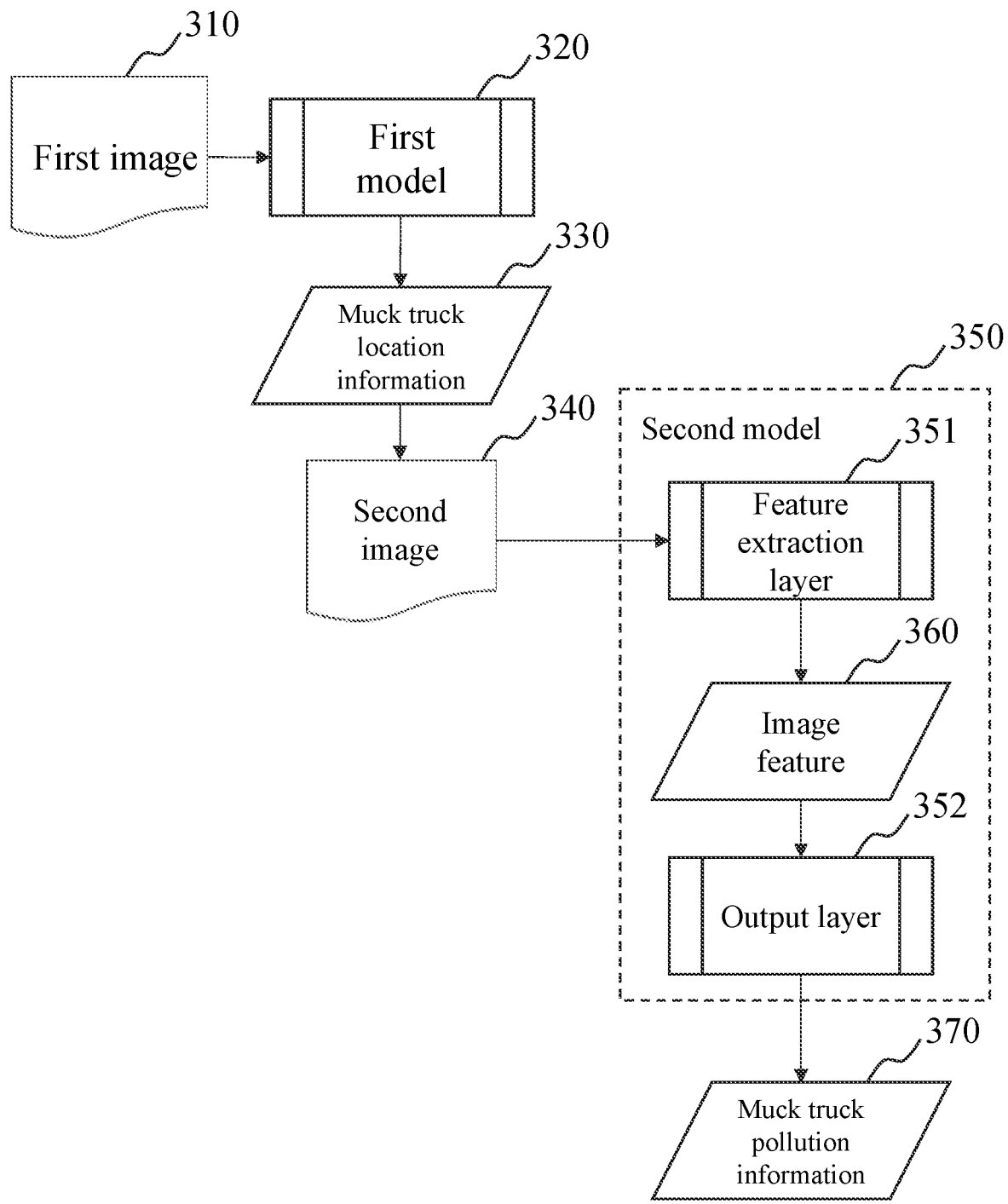
FIG. 3 is an exemplary schematic diagram of muck processing information analysis according to some embodiments of this disclosure.

FIG. 3 is the exemplary schematic diagram of muck processing information analysis according to some embodiments of this disclosure.

In some embodiments, the management platform may use a variety of methods and/or means to determine the pollution information of the muck truck. For example, the management platform may use methods or means such as modeling, image analysis, and statistical analysis to determine the pollution information of the muck truck.

In some embodiments, the management platform may use a first model to determine the muck truck location information (also referred to as location information of the muck truck) and use a second model to determine the pollution information of the muck truck. The first model and the second model may be a machine learning model. The second model may be a custom model and may at least include a feature extract layer and an output layer.

For example, the type of the first model, the second model, the feature extraction layer, and the output layer may include a convolutional neural network, a deep neural network, or a model obtained by combination thereof.

As shown in FIG. 3, the input of the first model 320 may be a first image 310, and the output may be the muck truck location information 330. The muck truck location information 330 may be used to determine a second image 340. In the second model 350, the input of the feature extraction layer 351 may be the second image 340, and the output may be an image feature 360. The input of the output layer may be the image feature 360, and the output may be the muck truck pollution information 370.

The muck truck pollution information 370 may refer to the pollution situation that the muck truck may cause to the surrounding environment. For example, the muck truck pollution information 370 may include the dropped muck situation information. As another example, the muck truck pollution information 370 may also include vehicle dust situation information, etc. For more information about the dropped muck situation information and the vehicle dust situation information, please see FIG. 4, FIG. 5 and related descriptions thereof.

The first image 310 may include image data around the construction site obtained by the target monitoring device. For example, the first image 310 may be a video and/or picture containing the muck truck. In some embodiments, the first image may be determined based on the muck truck monitoring data. For more contents about the construction site and the muck truck monitoring data, please see FIG. 2 and related descriptions thereof.

The second image 340 may include road image data before and after driving of the muck truck obtained by the target monitoring device. For example, the second image 340 may be a video and/or picture of the road after driving of the muck truck. In some embodiments, after determining the muck truck location information 330, the second image may be determined by the muck truck monitoring data obtained by the target monitoring device.

In some embodiments, the management platform may obtain the first model 320 and the second model 350 through training.

In some embodiments, a plurality of training samples and initial first model and initial second model may be obtained, and the initial first model and the initial second model are separately trained based on a plurality of training samples and the corresponding tags to obtain the first model 320 and the second model 350. The training samples of the first model may include first sample images, and the tags represent the muck truck location information corresponding to the samples; the training samples of the second model may include second sample images, and the tags represents the pollution information of the muck truck corresponding to the samples. In some embodiments, the samples and the tags may be obtained based on historical data. In some embodiments, the training samples may be inputted into the first model or the second model, and the parameters of the initial first model and the initial second model may be updated by training iteration until the trained models meet preset conditions and the trained first model and the second model are obtained. The preset conditions may be that the loss function is less than the threshold value, convergence, or the training cycle reaches the threshold value. In some embodiments, the method of iteratively updating the model parameters may include conventional model training methods such as random gradient descent.

In some embodiments, the second model 350 as well as the parameters of the feature extraction layer 351 and the output layer 352 thereof may be obtained through joint training. The output of the feature extraction layer 351 may be used as the input of the output layer 352.

For example, the sample training data is inputted to the initial feature extraction layer, that is, the second image of the samples, to obtain the image features outputted by the initial feature extraction layer, and the image features are used as the input of the initial output layer to obtain the muck truck pollution information outputted by the initial third model. The sample muck truck pollution information is utilized to verify the output of the initial feature extraction layer, and the reverse propagation features of the neural network model is utilized to obtain the verification data for the output result of the initial feature extraction layer. The verification data is utilized to continue the above training until the feature extraction layer and the output layer are completed training, and then the trained second model is obtained.

As another example, the second sample images may be inputted into the initial feature extraction layer, and the output layer of the initial feature extraction layer is inputted into the initial output layer. The loss function is constructed based on the output result of the initial output layer and the tags, and the parameters of the initial feature extraction layer and the initial output layer are simultaneously updated until the initial feature extraction layer and the initial output layer meet the preset conditions so that the trained feature extraction layer and the output layer are obtained, and then the second model 350 is obtained. For more descriptions on the preset conditions, please see the above relevant contents on separate model training.

In some embodiments of this disclosure, the muck truck location information and the muck truck pollution information are respectively obtained by using the trained first model and the second model, so that the data processing efficiency may be improved, the pollution situation when the muck truck runs on the road may be accurately determined, and user needs may be met.

Figure 4:
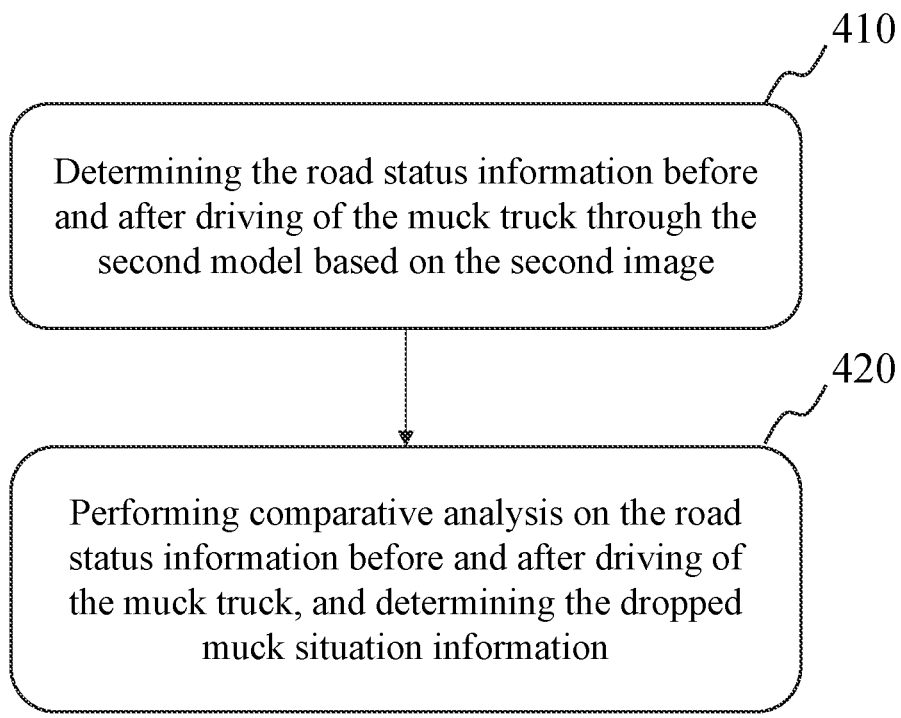
FIG. 4 is an exemplary flowchart of determining the muck truck pollution information according to some embodiments of this disclosure.

FIG. 4 is the exemplary flowchart of determining the muck truck pollution information according to some embodiments of this disclosure. As shown in FIG. 4, the process 400 is performed by the management platform and includes the following steps.

Step 410, determining the road status information before and after driving of the muck truck through the second model based on the second image.

The road status information may include the road status information obtained based on the target monitoring device, including information on whether there are mud stains on the road and fallen stones. It may be understood that when muck has dropped from the muck truck and/or the wheels are not cleaned up, it is liable to drop soil stones and/or leave mud stains when driving on the road.

In some embodiments, the road status information may be determined by analyzing the monitoring image. For example, the second model may be used to analyze the second image to determine the road status information before and after driving of the muck truck. For more contents about the second model, the second image, and the analysis method, please see FIG. 3 and related descriptions thereof.

Step 420, performing comparative analysis on the road status information before and after driving of the muck truck, and determining the dropped muck situation information.

The comparative analysis may include whether the road before and after the driving of the muck truck has mud stains and/or soil stones, as well as whether mud stains and/or soil stones increase, etc. It may be understood that there is no or small amount of mud stains and/or soil stains on the road before driving of the muck truck, and after driving of the muck truck, mud stains and/or soil stones begin to appear on the road or the number of mud stains and/or soil stones increases, which is likely to be caused by the muck truck.

In some embodiments, the criteria on which the comparative analysis is based may be adjusted according to whether the vehicle has dust. For example, when the vehicle dust situation information indicates the presence of dust, the threshold value corresponding to the criteria is lowered. The threshold value may refer to parameters used to judge the severity degree of the dropped muck situation of the muck truck. For example, the threshold value may be the number of soil stones on the road. When the number of soil stones in the road status information obtained based on the target monitoring device is greater than the threshold value, it is judged that the dropped muck situation of the muck truck is relatively severe.

It may be understood that when the dust of the vehicle is severe, it is likely to have a more severe dropped muck situation. For more descriptions on dust situation information, please see FIG. 5 and related descriptions thereof.

The criteria on which the comparative analysis is based may include the contrast of wheel stains, the contrast of the road, the size and number of soil stones, etc. It may be understood that greater contrast of mud stains, greater the contrast of the road, and larger the soil stones and/or higher amount of soil stones indicate more severe dropped muck situation.

The dropped muck information may include the dropped muck situation of the muck truck when driving on the road. For example, the dropped muck situation information may be determined by using the second model. For more descriptions of the second model and the determination method of the dropped muck situation information, please see FIG. 3 and related descriptions thereof.

In some embodiments of this disclosure, the criteria of the dropped muck situation of the muck truck are appropriately adjusted based on the vehicle dust situation to make the judgment results be more in line with reality.

In other embodiments of this disclosure, whether the muck truck has the dropped muck situation may be effectively judged based on the comparative analysis of the monitoring image features, the criteria are more intuitive, and the judgment accuracy is higher.

Figure 5:
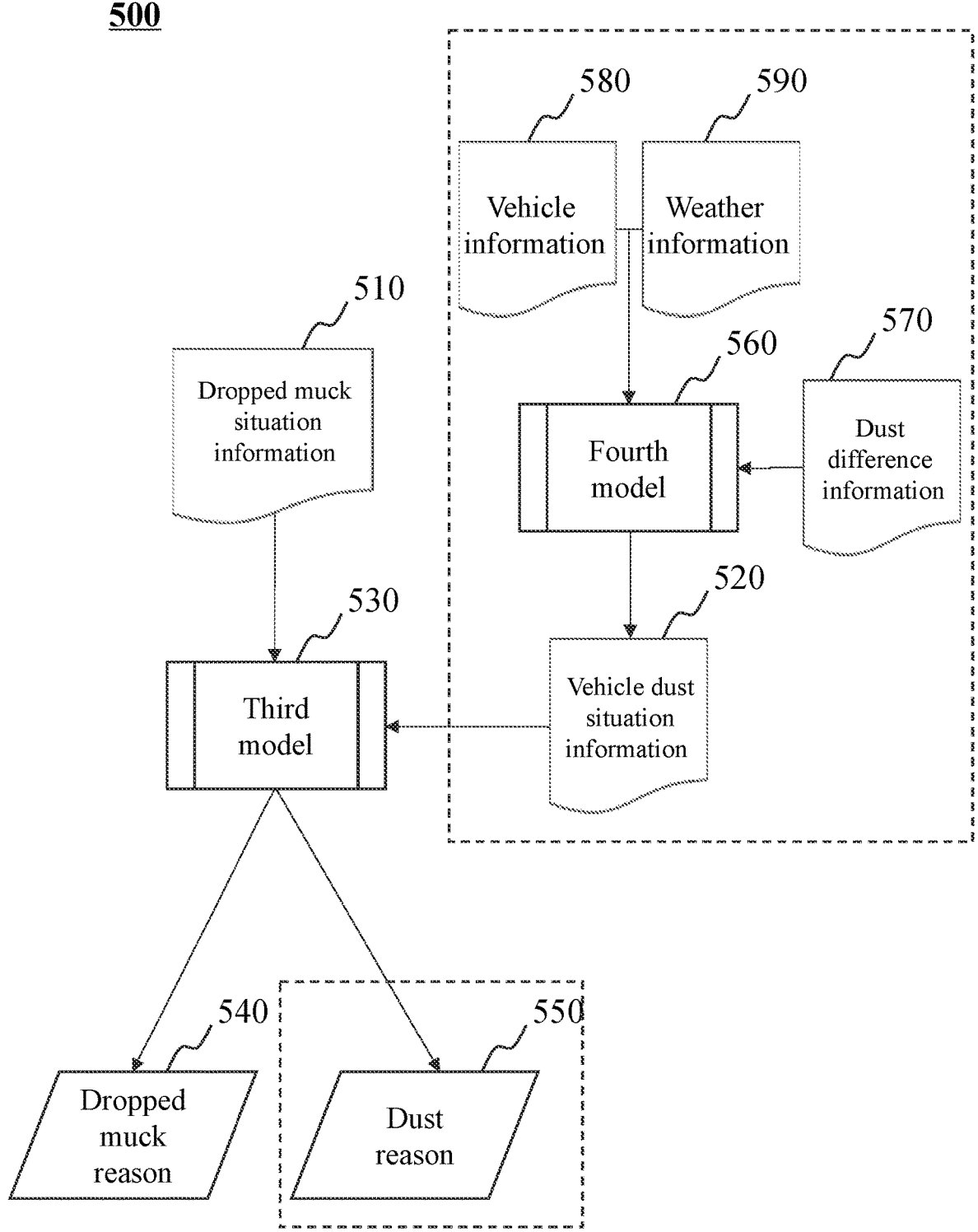
FIG. 5 is an exemplary schematic diagram of determining the dropped muck reason and the dust reason according to some embodiments of this disclosure.

FIG. 5 is the exemplary schematic diagram of determining the dropped muck reason and the dust reason according to some embodiments of this disclosure.

The third model may be used to determine the dropped muck reason of the muck truck. The third model may be a machine learning model, such as a model obtained by a convolutional neural network, a deep neural network, etc., or the combination thereof.

As shown in FIG. 5, the management platform may use the third model 530 to determine the dropped muck reason 540 and the dust reason 550 of the muck truck.

In some embodiments, the input of the third model 530 may include the dropped muck situation information 510 and/or the vehicle dust situation information 520, and the output of the third model 530 may include the dropped muck reason 540 and the dust reason 550.

The dropped muck situation information 510 may include the dropped muck information of the same muck truck in different time periods. The vehicle dust situation information 520 may include the dust information of the same muck truck in different time periods.

The management platform may issue different processing instructions in a targeted manner based on different reasons of the dropped muck and/or dust produced by the muck truck.

The processing instructions may refer to the instructions for the pollution situation of the muck truck issued by the management platform. The management platform may send the processing instructions to different user platforms according to different dropped muck reasons and dust reasons. For example, when the management platform judges that the problem is caused by the vehicle itself, the management platform may send the corresponding processing instructions to the owner or driver. The problem of the vehicle itself may include but not limited to the damage of the carriage, vibration of the vehicle, the failure of an automatic coverage system, etc. As another example, when the management platform judges that the problem is a vehicle cleaning problem at the construction site, the management platform may send the corresponding processing instructions to the construction site.

In some embodiments of this disclosure, the dropped muck information and the dust information of the muck truck are processed by using the machine learning model, the dropped muck reason and the dust reason of the muck truck may be quickly and accurately determined, and then different treatments may be carried out respectively, effectively maintaining the clean road and ensuring smooth progress of urban environmental protection.

The fourth model may be used to determine the vehicle dust situation information. The fourth model may also be a machine learning model, such as a model obtained by a convolutional neural network, a deep neural network, or the combination thereof, etc.

As shown in FIG. 5, the input of the fourth model 560 may include the dust difference information 570, the vehicle information 580, and the weather information 590, and the output of the fourth model 560 may be the vehicle dust situation information.

The dust difference information 570 may refer to the difference in dust caused by different vehicles. For example, the dust difference information 570 may include the difference in dust between the muck truck and other vehicles driving on the same road.

The vehicle information 580 may refer to the information of the vehicle driving on the same road as the muck truck. For example, vehicle information 580 may include information such as number of vehicles, types of vehicles, and speed of vehicles.

In some embodiments, the vehicle information 580 may be determined by analyzing the image data obtained by the target monitoring device. For example, the information such as the number of vehicles, the types of vehicles, and the speed of vehicles may be determined by identifying the license plate number in the image and the distance traveled by the vehicle during the unit time.

The weather information 590 may include weather types. For example, the weather information 590 may include weather conditions, wind direction and wind speed.

In some embodiments, the weather information may be obtained based on the third-party platform. For example, the weather information 590 of the current and next periods may be obtained based on the data released by the meteorological department.

It may be understood that different vehicle information and different weather information may have different impacts on the judgment results of vehicle dust conditions. For example, when there are many vehicles on the road, there may be more dust caused by other vehicles, rather than the muck truck. As another example, when the wind speed is high, the vehicle dust situation information outputted by the model may be more severe than that when there is no wind.

In some embodiments of this disclosure, the machine learning model is used to determine whether the vehicle has dust and the severity of the dust through the dust difference information of different vehicles in combination with weather conditions, the determined result is more in line with the actual situation and has a certain accuracy.

In some embodiments, the third model 530 and the fourth model 560 may be obtained through separate training or joint training.

In some embodiments, the training samples with the tags may be used to train the initial third model and the initial fourth model to obtain the third model 530 and the fourth model 560 respectively. The training samples of the initial third model may include the sample dropped muck situation information and the sample vehicle dust situation information, the corresponding tags of the samples may be the dropped muck reason and the dust reason. The training samples of the initial fourth model may include the sample vehicle information, the sample weather information, and the sample dust difference information. The corresponding tags of the samples may be the vehicle dust situation information. A plurality of groups of training samples with tags are respectively inputted into the initial third model and the initial fourth model, and the loss function is constructed based on the output of the initial third model and the initial fourth model respectively. The parameters of the initial third model and the initial fourth model are iteratively updated respectively based on the loss function until the preset conditions are met, the training is ended, and the trained third model and the fourth model are obtained. For more descriptions on the preset conditions, please see FIG. 3 and related descriptions thereof.

In some embodiments, the third model 530 and the fourth model 560 may also be obtained through joint training. The output of the fourth model 560 may be used as the input of the third model 530.

For example, the sample training data is inputted to the initial fourth model, that is, the sample vehicle information, the sample weather information, and the sample dust difference information, and the vehicle dust condition information output by the initial fourth model may be obtained. The vehicle dust condition information and the sample dropped muck situation information are used as the input of the initial third model to obtain the dropped muck reason and the dust reason outputted by the initial third model. The sample dropped muck reason and the sample dust reason are utilized to verify the output of the initial third model, the reverse propagation features of the neural network model are utilized to obtain the verification data of the output result of the initial fourth model. The verification data is utilized to continue the above training until the trained third model and the fourth model are obtained.

As another example, the sample vehicle information, the sample weather information, and the sample dust difference information may be inputted into the initial fourth model, and the output results of the initial fourth model and the sample dropped muck situation information are inputted into the initial third model together, the loss function is constructed based on the output results of the initial third model and the tags, and the parameters of the initial fourth model and the initial third model are simultaneously updated until the initial fourth model and the initial third model meet the preset conditions, thereby obtaining the trained fourth model and the third model. For more descriptions on the preset conditions, please see FIG. 3 and related descriptions thereof.

In some embodiments of this disclosure, the dropped muck reason and the dust reason of the muck truck may be quickly and accurately determined based on a large amount of extensive data by using the trained machine learning model to process in time to improve the processing efficiency. In addition, the model training efficiency may be improved through joint training of the third model and the fourth model.

In some embodiments of this disclosure, the scope of monitoring may be reduced by determining the target monitoring device to effectively reduce the calculation of the muck truck management system; the management platform performs muck processing analysis on the muck truck monitoring data, and uses the trained machine learning model for analysis to quickly and accurately determine the muck truck pollution reason, and clarify the responsible party. The management platform generates the muck truck management information and sends the muck truck management information to the user platform to effectively improve the efficiency of processing, better manage the muck trucks, and reduce the impact of muck truck transportation on urban sanitation, air quality, and traffic safety.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for muck truck management in a smart city based on Internet of Things, wherein the method is implemented based on a system for muck truck management in a smart city, the method is performed by a management platform, the method comprising:
   obtaining construction site information;
   determining a target monitoring device of a target site based on the construction site information;
   obtaining muck truck monitoring data of the target site through the target monitoring device; and
   generating muck truck management information by performing muck processing information analysis based on the muck truck monitoring data; wherein
   the muck processing information analysis includes:
   determining road status information before and after driving of a muck truck through a second model based on a second image, respectively, the second model being a machine learning model; and
   determining dropped muck situation information of the muck truck based on comparative analysis of the road status information before and after driving of the muck truck; wherein
   the criteria on which the comparative analysis is based includes a contrast of wheel stains, a contrast of the road, a size and number of soil stones; and the criteria on which the comparative analysis is based is adjusted according to a dust situation of the muck truck;
   obtaining dropped muck situation information of the muck truck in different time periods;
   determining a dropped muck reason through a third model based on the dropped muck situation information of the muck truck in the different time periods and issuing a processing instruction; wherein the dropped muck reason includes one of a problem caused by the vehicle itself and a vehicle cleaning problem at the construction site; the problem of the vehicle itself at least includes the damage of a carriage, vibration of the vehicle, the failure of an automatic coverage system; an input of the third model includes dropped muck situation information and/or vehicle dust condition information, and an output of the third model includes a dropped muck reason and/or a dust reason;
   issuing different processing instructions based on different reasons of the dropped muck and/or dust produced by the muck truck; wherein
   the adjusting the criteria includes:
   when the vehicle dust situation information indicating the presence of dust, lowering a threshold value corresponding to the criteria, the threshold value referring to parameters used to judge a severity degree of the dropped muck situation of the muck truck; wherein
   the determining the dust situation includes:
   obtaining dust difference information before and after driving of the muck truck and other vehicles; and
   determining vehicle dust situation information through a fourth model based on the dust difference information before and after driving of the muck truck and other vehicles in combination with vehicle information and weather information, the fourth model being a machine learning model; wherein
   the third model and the fourth model are obtained by joint training, and the joint training includes:
   obtaining the vehicle dust condition information output by an initial fourth model by inputting sample vehicle information, sample weather information, and sample dust difference information into the initial fourth model;

obtaining the dropped muck reason and the dust reason output by an initial third model by using an output of the initial fourth model and a sample dropped muck situation information as an input of the initial third model; and verifying an output of the initial third model using the sample dropped muck reason and the sample dust reason, obtaining verification data of the output of the initial fourth model using reverse propagation features of a neural network model, and continuing the above training using the verification data until a trained third model and a trained fourth model are obtained.

2. The method of claim 1, wherein the system for muck truck management in the smart city includes a user platform, a service platform, the management platform, a sensor network platform and an object platform, wherein:

the user platform is configured to send a muck truck management information query instruction to the service platform, receive the muck truck management information and feed back the muck truck management information to a user;

the service platform is configured to receive the muck truck management information query instruction sent by the user platform, send the muck truck management information query instruction to the management platform after storage processing, and obtain the muck truck management information from the management platform and send the muck truck management information to the user platform after storage processing;

the management platform is configured to respond to a user's query request, process the muck truck monitoring data, and determine the muck truck management information; the management platform is also configured to receive the muck truck management information query instruction sent by the service platform, and send the muck truck management information to the service platform; the management platform includes a general database and a plurality of management sub-platforms;

the sensor network platform includes a plurality of sensor network sub-platforms which correspond to the management sub-platforms in a one-to-one manner; the sensor network sub-platforms are configured to receive instructions for obtaining the muck truck monitoring data sent by the management platform, and send the instructions to object sub-platforms; the sensor network sub-platforms are also configured to receive the muck truck monitoring data obtained by the object sub-platforms, and send the muck truck monitoring data to the corresponding management sub-platforms;

the object platform includes a plurality of object sub-platforms divided according to different urban areas, which correspond to the sensor network sub-platforms in a one-to-one manner; the object sub-platforms are configured to receive the instructions for obtaining the muck truck monitoring data sent by the sensor network sub-platforms, and send the muck truck monitoring data to the corresponding sensor network sub-platforms.

3. The method of claim 1, wherein obtaining the second image includes:

obtaining a first image through the target monitoring device;

treating the first image through a first model to determine muck truck location information; and obtaining a second image through the target monitoring device based on the muck truck location information.

4. A system for muck truck management in a smart city based on Internet of Things, wherein the system includes a management platform configured to:

obtain construction site information;

determine a target monitoring device of a target site based on the construction site information;

obtain muck truck monitoring data of the target site through the target monitoring device; and generate muck truck management information by performing muck processing information analysis based on the muck truck monitoring data; wherein the muck processing information analysis includes:

determining road status information before and after driving of a muck truck through a second model based on a second image, respectively, the second model being a machine learning model; and determining dropped muck situation information of the muck truck based on comparative analysis of the road status information before and after driving of the muck truck; wherein the criteria on which the comparative analysis is based includes a contrast of wheel stains, a contrast of the road, a size and number of soil stones; and the criteria on which the comparative analysis is based is adjusted according to a dust situation of the muck truck;

obtaining dropped muck situation information of the muck truck in different time periods;

determining a dropped muck reason through a third model based on the dropped muck situation information of the muck truck in the different time periods and issuing a processing instruction; wherein the dropped muck reason includes one of a problem caused by the vehicle itself and a vehicle cleaning problem at the construction site; the problem of the vehicle itself at least includes the damage of a carriage, vibration of the vehicle, and the failure of an automatic coverage system; an input of the third model includes dropped muck situation information and/or vehicle dust condition information, and an output of the third model includes a dropped muck reason and/or a dust reason;

issuing different processing instructions based on different reasons of the dropped muck and/or dust produced by the muck truck; wherein the adjusting the criteria includes:

when the vehicle dust situation information indicating the presence of dust, lowering a threshold value corresponding to the criteria, the threshold value referring to parameters used to judge a severity degree of the dropped muck situation of the muck truck; wherein the determining the dust situation includes:

obtaining dust difference information before and after driving of the muck truck and other vehicles; and determining vehicle dust situation information through a fourth model based on the dust difference information before and after driving of the muck truck and other vehicles in combination with vehicle information and weather information, the fourth model being a machine learning model; wherein the third model and the fourth model are obtained by joint training, and the joint training includes:

obtaining the vehicle dust condition information output by an initial fourth model by inputting sample vehicle information, sample weather information, and sample dust difference information into the initial fourth model;

obtaining the dropped muck reason and the dust reason output by an initial third model by using an output of the initial fourth model and sample dropped muck situation information as an input of the initial third model; and verifying an output of the initial third model using the sample dropped muck reason and the sample dust reason, obtaining verification data of the output result of the initial fourth model using reverse propagation features of a neural network model, and continuing the above training using the verification data until a trained third model and a fourth model are obtained.

* * * * *